(12) United States Patent
Fenton et al.

(10) Patent No.: US 11,282,077 B2
(45) Date of Patent: Mar. 22, 2022

(54) DATA COMPARISON EFFICIENCY FOR REAL-TIME DATA PROCESSING, MONITORING, AND ALERTING

(71) Applicant: Walmart Apollo, LLC, Bentonville, AR (US)

(72) Inventors: Timothy Fenton, Bentonville, AR (US); Georgi D. Gospodinov, Bentonville, AR (US); Fred Helm, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 203 days.

(21) Appl. No.: 16/106,632

(22) Filed: Aug. 21, 2018

(65) Prior Publication Data

US 2019/0057381 A1 Feb. 21, 2019

Related U.S. Application Data

(60) Provisional application No. 62/548,101, filed on Aug. 21, 2017.

(51) Int. Cl.
*G06Q 20/40* (2012.01)
*G06Q 20/38* (2012.01)
*G06Q 20/34* (2012.01)
*G06Q 20/22* (2012.01)

(52) U.S. Cl.
CPC ....... *G06Q 20/389* (2013.01); *G06Q 20/2295* (2020.05); *G06Q 20/342* (2013.01); *G06Q 20/405* (2013.01)

(58) Field of Classification Search
CPC ............ G06Q 20/4016; G06Q 20/389; G06Q 20/2295; G06Q 20/342; G06Q 20/405
See application file for complete search history.

(56) References Cited

U.S. PATENT DOCUMENTS

| | | | |
|---|---|---|---|
| 6,189,789 B1 | 2/2001 | Levine et al. | |
| 6,947,937 B1 | 9/2005 | Winter et al. | |
| 7,233,843 B2 | 6/2007 | Budhraja et al. | |
| 7,233,933 B2 | 6/2007 | Horvitz et al. | |

(Continued)

FOREIGN PATENT DOCUMENTS

| | | |
|---|---|---|
| JP | 2008027286 A | 2/2008 |
| JP | 2008203974 A | 9/2008 |

(Continued)

OTHER PUBLICATIONS

Ando, "Detecting Fraudulent Behavior Using Recurrent Neural Networks", Computer Security Symposium 2016. Oct. 2016. (Year: 2016).*

(Continued)

*Primary Examiner* — Abdulmajeed Aziz
(74) *Attorney, Agent, or Firm* — Patterson Thuente Pedersen, P.A.

(57) ABSTRACT

According to embodiments, systems and methods for tracking gift card usage improve the speed and efficiency of anomalous transaction detection. Individual transaction data is enriched to form parent records that include indicators that the card is being used outside of established usage criteria or in a way that is otherwise abnormal. Machine learning can improve upon anomalous transactions more quickly using this enriched, parent-level information.

20 Claims, 5 Drawing Sheets

(56) References Cited

U.S. PATENT DOCUMENTS

| | | |
|---|---|---|
| 7,543,739 B2 | 6/2009 | Brown et al. |
| 7,689,455 B2 | 3/2010 | Fligler et al. |
| 7,780,081 B1 | 8/2010 | Liang |
| 7,805,362 B1 | 9/2010 | Merrell et al. |
| 7,870,174 B2* | 1/2011 | Eadon ................... G06F 16/284 |
| | | 707/953 |
| 7,980,464 B1 | 7/2011 | Sarris et al. |
| 8,412,601 B2 | 4/2013 | Grant, Jr. et al. |
| 8,438,074 B2 | 5/2013 | Serbanescu |
| 8,527,418 B2 | 9/2013 | Enzaldo et al. |
| 8,606,706 B2 | 12/2013 | Zanzot et al. |
| 8,612,573 B2 | 12/2013 | Seidman et al. |
| 8,639,592 B1 | 1/2014 | Rouse et al. |
| 8,666,841 B1 | 3/2014 | Claridge et al. |
| 8,725,667 B2 | 5/2014 | Kaushal et al. |
| 8,732,013 B2 | 5/2014 | Senghore et al. |
| 8,751,399 B2 | 6/2014 | Kolhatkar et al. |
| 9,195,822 B2 | 11/2015 | Carlson et al. |
| 9,256,761 B1* | 2/2016 | Sahu ................. G06F 16/90335 |
| 9,384,629 B2 | 7/2016 | Chun et al. |
| 9,892,438 B1 | 2/2018 | Kunda et al. |
| 10,394,809 B1 | 8/2019 | Lu |
| 10,394,810 B1 | 8/2019 | Lu |
| 10,430,387 B2 | 10/2019 | Falkenberg et al. |
| 10,438,242 B1 | 10/2019 | Carr et al. |
| 2002/0099579 A1 | 6/2002 | Stowell et al. |
| 2003/0033228 A1 | 2/2003 | Bosworth-Davies et al. |
| 2006/0294095 A1 | 12/2006 | Berk et al. |
| 2007/0050777 A1 | 3/2007 | Hutchinson et al. |
| 2007/0063016 A1 | 3/2007 | Myatt et al. |
| 2007/0282665 A1 | 12/2007 | Buehler et al. |
| 2008/0288889 A1 | 11/2008 | Hunt et al. |
| 2009/0058644 A1 | 3/2009 | French et al. |
| 2010/0004981 A1 | 1/2010 | Katz et al. |
| 2010/0114617 A1 | 5/2010 | Bobbitt |
| 2010/0153225 A1 | 6/2010 | Ferro et al. |
| 2010/0169137 A1 | 6/2010 | Jastrebski et al. |
| 2010/0274679 A1 | 10/2010 | Hammad |
| 2011/0035271 A1 | 2/2011 | Weaver et al. |
| 2011/0087535 A1 | 4/2011 | Yoshizawa et al. |
| 2011/0270618 A1 | 11/2011 | Banerjee et al. |
| 2012/0095805 A1 | 4/2012 | Ghosh et al. |
| 2012/0109821 A1* | 5/2012 | Barbour ................. G06Q 40/02 |
| | | 705/44 |
| 2012/0226613 A1 | 9/2012 | Adjaoute |
| 2012/0320214 A1 | 12/2012 | Kundu |
| 2013/0027561 A1 | 1/2013 | Lee et al. |
| 2013/0311518 A1* | 11/2013 | Agbaria ............... G06F 16/2379 |
| | | 707/803 |
| 2014/0058914 A1 | 2/2014 | Song et al. |
| 2014/0095281 A1 | 4/2014 | Weiss et al. |
| 2014/0188639 A1 | 7/2014 | Dinardo |
| 2014/0236820 A1 | 8/2014 | Carlton et al. |
| 2014/0337064 A1* | 11/2014 | Weissman .......... G06Q 30/0627 |
| | | 705/5 |
| 2014/0365334 A1 | 12/2014 | Hurewitz |
| 2015/0029339 A1 | 1/2015 | Kobres et al. |
| 2015/0032752 A1 | 1/2015 | Greifeneder et al. |
| 2015/0041616 A1 | 2/2015 | Gentile et al. |
| 2015/0081349 A1 | 3/2015 | Johndrow et al. |
| 2015/0088652 A1 | 3/2015 | Finley et al. |
| 2015/0088753 A1* | 3/2015 | Van ........................ G06Q 20/36 |
| | | 705/67 |
| 2015/0095189 A1 | 4/2015 | Dharssi et al. |
| 2015/0127496 A1 | 5/2015 | Marathe et al. |
| 2015/0149365 A1 | 5/2015 | Mobini |
| 2015/0161596 A1 | 6/2015 | McCarthy |
| 2015/0193794 A1 | 7/2015 | Douglas et al. |
| 2015/0242899 A1 | 8/2015 | Farhi |
| 2015/0279155 A1 | 10/2015 | Chun et al. |
| 2016/0110791 A1 | 4/2016 | Herring et al. |
| 2016/0125492 A1 | 5/2016 | Walker et al. |
| 2016/0189159 A1 | 6/2016 | Luk et al. |
| 2016/0314449 A1 | 10/2016 | Shmilovitz |
| 2016/0335666 A1 | 11/2016 | Dodor et al. |
| 2017/0004422 A1 | 1/2017 | Todd et al. |
| 2017/0046708 A1 | 2/2017 | High et al. |
| 2017/0083985 A1* | 3/2017 | Lacoss-Arnold ...... G06Q 40/12 |
| 2017/0323359 A1 | 11/2017 | Det et al. |
| 2018/0322514 A1 | 11/2018 | Sargent et al. |
| 2020/0175518 A1* | 6/2020 | Chu .................. G06Q 20/4016 |

FOREIGN PATENT DOCUMENTS

| | | |
|---|---|---|
| WO | WO 00/73971 A1 | 12/2000 |
| WO | WO 03/077569 A1 | 9/2003 |
| WO | WO2011143675 A2 | 11/2011 |
| WO | WO 2015/103020 A1 | 7/2015 |
| WO | WO 2016/138183 A1 | 9/2016 |

OTHER PUBLICATIONS

International Search Report and Written Opinion for corresponding PCT Application No. PCT/US2018/047513 dated Oct. 19, 2018; 7 pages.

Ogbodo et al.; "The Economic Implications of Money Laundering in Nigeria", $HR_{MARS}$ Exploring Intellectual Capital; International Journal of Academic Research in Accounting, Finance and Management Sciences; vol. 3, No. 4, Oct. 2013, pp. 170-184; E-ISSN: 2225-8329, P-ISSN: 2308-0337; 15 pages total; www.hrmars.com.

U.S. Appl. No. 16/108,826, filed Aug. 22, 2018, Inventor(s): Moustafa et al.

U.S. Appl. No. 16/130,095, filed Sep. 13, 2018, Inventor(s): Gospodinov.

Application and Filing Receipt for U.S. Appl. No. 15/583,264, filed May 1, 2018, Inventor(s): Dey et al.

Application and Filing Receipt for U.S. Appl. No. 15/972,743, filed May 7, 2018, Inventor(s): Sargent et al.

Application and Filing Receipt for U.S. Appl. No. 15/226,540, filed Aug. 2, 2016, Inventor(s): High et al.

International Search Report and Written Opinion for PCT Application No. PCT/US2017/030389, dated Jul. 19, 2017, 9 pages.

International Search Report and Written Opinion for corresponding International Application No. PCT/US2018/031388 dated Aug. 2, 2018; 6 pages.

FRAMES; Fraud Real-Time Alerting & Monitoring Enterprise System, ZMS Info; 2012; 2 pages.

International Search Report for corresponding International Application No. PCT/US2018/047305 dated Nov. 7, 2018; 7 pages.

* cited by examiner

| Cust. ID | Time | Store | State | Card | Transactions |
|---|---|---|---|---|---|
| | | | | | |

| Transaction | Cust. ID | Trans. amt. | Total Sales |
|---|---|---|---|
| | | | |

| Total Sales | Avg sale | # trans. | # cards | #devices |
|---|---|---|---|---|
| | | | | |

| Transaction | Store | State | Time | W/in 24 hr. | Amt. |
|---|---|---|---|---|---|
| | | | | | |

DATA COMPARISON EFFICIENCY FOR REAL-TIME DATA PROCESSING, MONITORING, AND ALERTING

RELATED APPLICATION

The present application claims the benefit of U.S. Provisional Application No. 62/548,101 filed Aug. 21, 2017, which is hereby incorporated herein in its entirety by reference.

TECHNICAL FIELD

Embodiments of the present disclosure relate generally to the field of monitoring or identifying anomalous transactions or patterns.

BACKGROUND

Transaction data from retail and online sales can indicate patterns of use. Multiple transactions within a short period of time can indicate that a gift card is being used electronically, and possibly that it is being used by software rather than a human. Transactions at multiple in-store locations and corresponding returns or account balance checks also follow established patterns. Often, unique patterns of use can be identified after a gift card, credit card, or other purchasing tool or account is misplaced or misused.

Several agencies, including both retailers and credit card companies, have established criteria that can be monitored to detect potential misuse in order to protect their consumers and customers. Such monitoring is often tied to known aspects of a particular customer, such as his or her typical purchasing location(s) as well as the types of goods that are typically purchased.

SUMMARY

According to an embodiment, a method for rapid analysis of transactional data in a retail environment includes receiving a first set of data from a source of real-time financial data, translating the first set of data into mainframe-formatted data for ingestion in a search database, receiving a second set of data from a source of static financial data, translating the second set of data into mainframe-formatted data for ingestion in the search database, enriching at least some of the first set of data and the second set of data to include fields indicative of anomalous transactions to form enriched data, mapping indicators of anomalous transactions onto the enriched data, and outputting the indicators of anomalous transactions for ingestion in the search database.

In embodiments, receiving the first set of data from the source of real-time financial data comprises receiving real-time transaction data from a plurality of sources in the retail environment. In embodiments, receiving the first set of data from a source of real-time financial data comprises receiving real-time transaction data from an online store. In embodiments, mapping indicators of anomalous transactions to the enriched data further comprises detecting misuse of a gift card to protect an owner of the gift card. In embodiments, the fields indicative of anomalous transactions include gift card activity dates. In embodiments, the fields indicative of anomalous transactions include a number of gift card account balance checks. In embodiments, the fields indicative of anomalous transactions include at least one location of gift card use. In embodiments, the fields indicative of anomalous transactions include a transaction amount, and the fields indicative of anomalous transactions may further include a gift card balance. In embodiments, outputting the indicators of anomalous transactions comprises displaying a list of anomalous transactions.

According to another embodiment, a system for rapid analysis of transactional data includes a source of real-time financial data, a source of static financial data, an ingestion module configured to translate a first set of data from the source of real-time financial data into mainframe-formatted data for ingestion in a search database, an ingestion module configured to translate a second set of data from the source of static financial data into mainframe-formatted data for ingestion in the search database, an enrichment module configured to enrich at least some of the first set of data and the second set of data to include fields indicative of anomalous transactions to form enriched data, a mapping module configured to map indicators of anomalous transactions onto the enriched data, and a display configured to output the indicators from the mapping module.

In embodiments, the ingestion module configured to translate the first set of data from the source of real-time financial data into mainframe-formatted data for ingestion in the search database is the same as the ingestion module configured to translate the second set of data from the source of static financial data into mainframe-formatted data for ingestion in the search database. In embodiments, the first set of data comprises real-time transaction data in a retail environment. In embodiments, the first set of data comprises real-time transaction data at an online store. In embodiments, the mapping module is configured to detect misuse of a gift card to protect an owner of the gift card. In embodiments, the fields indicative of anomalous transactions include gift card activity dates. In embodiments, the fields indicative of anomalous transactions include a number of gift card account balance checks. In embodiments, the fields indicative of anomalous transactions include at least one location of gift card use. In embodiments, the fields indicative of anomalous transactions include a transaction amount. In embodiments, the fields indicative of anomalous transactions further include a gift card balance.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

In order to more accurately and rapidly monitor transaction data, real-time streaming or batch transaction data from a multitude of sources can be parsed and enriched for analysis and visualization. Rapid analysis of such data is particularly important when the transaction data relates to a purchase using tender that is not directly linked to a customer, such as a gift card. In such situations, misuse or malfunction of the card can cause irretrievable loss of the value of the card for the cardholder. Furthermore, the types of flags and indicators conventionally available to track credit card misuse, such as purchases inconsistent with the cardholder's location and other purchasing habits, may not be available for gift cards, which are relatively anonymous. Therefore, according to embodiments, as data is ingested a high-level "parent" record that is uniquely indexed to each gift card number can be created and updated. Features of each transaction that are salient can be associated with the parent record, to create a transaction history.

Figure 1:
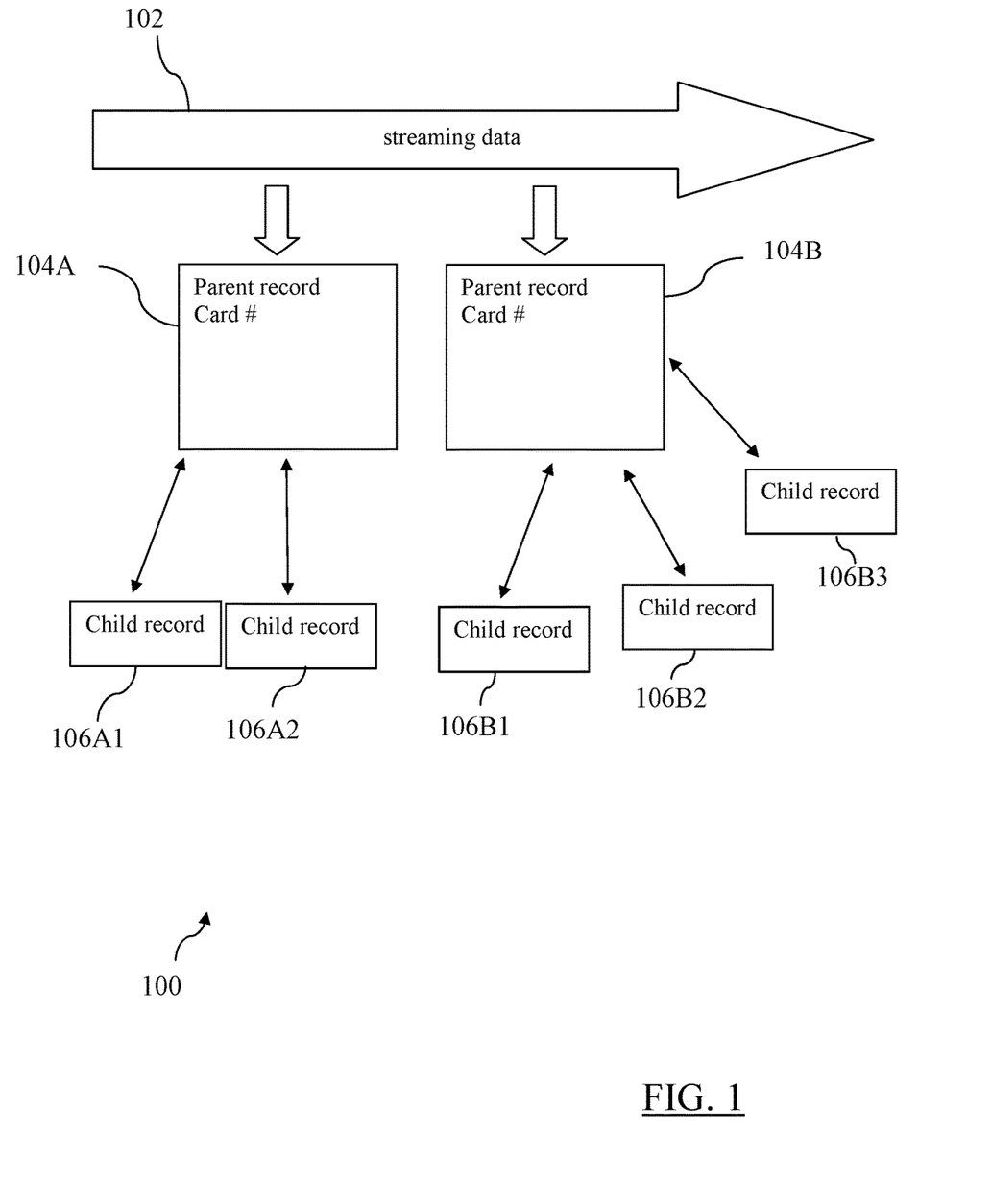
FIG. 1 is a data flow diagram according to an embodiment.

FIG. 1 shows a system 100 for maintaining and monitoring transaction data according to an embodiment. In system 100, streaming data 102 is divided into parent records 104A and 104B, categorized by card number. In an embodiment, purchase data from streaming data 102 is compiled and parsed by a Python application or looking for text offsets, which is output to a CSV file. Those of skill in the art will recognize that in alternative embodiments streaming data 102 could be parsed and separated into parent records 104A, 104B using many other types of software.

Streaming data 102 can including aggregated transaction data received from a plurality of retail sites. Each retail site can have a number of transaction processing systems which each include point-of-sale (POS) systems such as cash registers, or transaction aggregation servers. A transaction processing system can be in continuous or intermittent data communication with a transaction data store in order to provide transaction data records for each retail transaction.

Each transaction data record can include the monetary value and the payment method (such as cash, gift card, check, credit or debit card, or the like) for each transaction. Transaction data records can further include links to, or be otherwise associated with, the retail site, market and/or region where the transaction took place, customer information (if available), and an indication of the items, which can be goods or services involved in the transaction. Transaction data store can reside within a single database system, or can comprise a distributed file system, or other storage mechanisms such that transaction data store resides across multiple computing systems.

System 100 can therefore comprise, or be communicably coupled to the transaction data store, or the transaction processing system to receive streaming data 102 as new transaction records are created. System 100 can present one or more network interfaces to receive data (including transaction data), and provide outputs to one or more user devices.

The salient features that are recorded and associated with each parent record (104A, 104B) include a maximum gift card balance, a maximum or minimum transaction amount, dates and times the gift card was used, the store that the card was used at, the amount of activation of the gift card, and the frequency and timing of online balance checks. Each parent record (104A, 104B) includes a summary of the records associated with that particular card number.

More specific information relating to the use of each card is stored in child records. As shown in system 100 of FIG. 1, parent record 104A is associated with two child records 106A1 and 106A2. Likewise, parent record 104B is associated with child records 106B1, 106B2, and 106B3. Each parent record has a link (shown with arrows in FIG. 1) to its associated child record(s) and vice versa, such that a user of the system 100 can move between the two as desired. This permits for rapid querying of misuse or malfunction indicators at the parent record level, and identification of specific transactions of interest at the child level.

System 100 facilitates customer fraud protection by more quickly and easily identifying unintended use of a gift card or similar payment mechanism. By separating transactions first by card number, then into summary and detailed parent and child records, querying of card usage can be conducted within seconds that would take hours, days, or even weeks using conventional monitoring systems. Additionally, system 100 facilitates monitoring of types of misuse that are specific to gift cards. For example, gift cards may be subject to online reselling, with or without the permission of the original purchaser. In some circumstances, online resale of a gift card may be permissible and desirable, whereas in other circumstances the online resale may be due to a hacked, guessed, or stolen card number. As described in more detail below, in embodiments the system 100 can determine with a high degree of certainty whether the online resale is likely to be a legitimate resale or gift, or whether the online resale and subsequent use appears to be the result of misuse.

Figure 2:
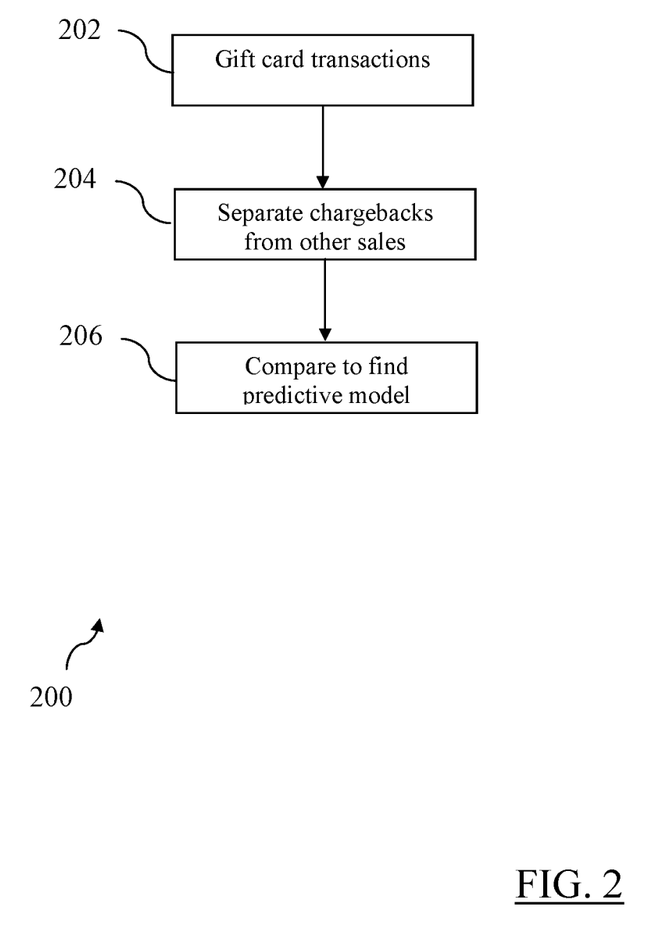
FIG. 2 is a flowchart of a method according to an embodiment.

FIG. 2 depicts a method 200 for detecting misuse of gift cards.

At 202, the method includes gathering a corpus of gift card transactions. Gathering the transactions can include periodic gathering up of all of the child records (e.g., child records 106A1, 106A2, 106B1-106B3 as described with respect to FIG. 1) within a given time period. In an embodiment, all child records within a 24-hour period can be gathered at 202.

At 204, chargebacks are separated from other sales at 204. Chargebacks include transactions that are losses caused by fraudulent or disputed transactions. A gift card chargeback is typically associated with gift card misuse or malfunction, and accordingly the subset of chargebacks provides a good contrasting dataset with the rest of the larger pool of transactions gathered at 202 for determining indicators associated with misuse.

The separated chargebacks and other sales can be compared to find a predictive model at 206, which can be used subsequently to identify real-time transaction and balance check data indicative of gift card misuse. The two contrasting sets of data (chargeback and non-chargeback) are compared to find a predictive model that can be applied to real-time sales, and particularly to the parent records (e.g., parent records 104A and 104B of FIG. 1). From these comparisons, a predictive model can be determined, for example using machine learning, as described in more detail below. In an embodiment, the comparison can take the form of machine learning using a Random Forest test based on sets of known anomalous or non-anomalous transactions. The model produced by that test can then be applied to new data to make predictions based on rapidly-accessible, parent record data. For example, the predictive model can analyze trends and significant differences between the parent records (104A, 104B) of anomalous and non-anomalous datapoints.

Examples of the type of data that can be monitored for in-store transactions include high value transactions, use of a single card at multiple stores within a short period of time, and even large dollar amounts being loaded onto a card, for example. Transactions can be flagged as high value if they exceed the typical gift card amount by a certain percentage or a certain dollar amount. Similarly, transactions online can be monitored for multiple, small uses within a short amount of time, which can be compared to typical gift card uses or balance checks, in embodiments. These and other card use patterns can be stored at the parent record level for real-time analysis. The amount above typical usage that will cause the systems described herein to flag the transactions can be adjusted and machine learning can be used to determine how much above average or median value is associated with increased risk of anomalous or unauthorized usage. In one embodiment, transactions greater than 400% of the average transaction amount can be flagged. In embodiments, transactions in-store followed by an online balance check within a time frame of 15 minutes can be flagged. In embodiments activation of a gift card in a store for $500 or more, followed by a redemption check within 24 hours, can be flagged. In embodiments, any number of balance checks more than three in 24 hours can be flagged. Depending on the amount, the time difference between usage and balance checks, and the number of balance checks, as well as whether usage in-store or online, can be monitored by machine learning programs to determine what combinations are more often associated with unauthorized transactions.

Indicators of anomalous transactions can be mapped or displayed in several ways. For example, there may be temporal patterns to anomalous transactions, such as a rise in activity due to unauthorized access to gift card information. Alternatively, data can be displayed as a "heat map" geographically to indicate when certain regions or certain stores have been subject to a large number of anomalous transactions. Such visualizations, such as those described below with respect to FIGS. 3A and 3B, can help identify patterns in card misuse such that a retailer or gift card vendor can improve card security for its customers. These visualizations can be presented to a user at a computing device such as a desktop or laptop computer, or mobile device such as a smartphone or tablet.

Fields that are tracked in child records can include:

| | |
|---|---|
| Merchant type | Type of store |
| Store number | A unique number or letter identifier of a store |
| Register ID | A point of sale in a physical store |
| Transaction number | The first data transaction identifier |
| Account number | A unique identifier for a gift card |
| Amount sign | An indication of whether the transaction was for a negative amount (adding value/activation) or positive amount (purchase/redemption) |
| Amount | A transaction value |
| Response code | A response code from a vendor or facilitator of the purchase indicating the status of the transaction (e.g., chargeback, successful payment) |
| Reverse ID | A non-zero placeholder indicating if a transaction is reversed |
| Card balance | A balance remaining on the card after the transaction |
| Promo code | Used to indicate a particular type of card, such as graduation card |
| GMT Timestamp | Date and time of the transaction in a common time zone (e.g., GMT) |
| Term date | Date and time in the local timezone of the transacting store |
| Reverse date | A placeholder that is non-zero when a transaction is reversed |
| Account origin | The location of purchase of the gift card |
| Activation date | A date and time of activation of the gift card |
| Activation merchant ID | Merchant ID of a location where the card was activated |
| Activation store number | A unique identifying number of the store where the gift card was activated |

While other fields may also be tracked, these fields have been found to be among the most likely to include correlations to gift card misuse or malfunction.

After enrichment, some or all of the following fields can be included in the gift card transaction data to form enriched data:

| | |
|---|---|
| Account number | An account number or identifier of a known user associated with the gift card |
| Account origin | The location of purchase of the gift card |
| Activation date | A date and time of activation of the gift card |
| Activation merchant ID | Merchant ID of a location where the card was activated |
| Card balance | A balance remaining on the card after the transaction |
| City name | The name of the city the store is located in |
| Count balance check | A number of times within a given period (e.g., 24 hours) that the balance of a card is checked online |
| Country code | The country code of the store where the card is used |
| Dotcom | Boolean indicator to show whether the card is an online card or a physical card |
| GMT Timestamp | Date and time of the transaction in a common time zone (e.g., GMT) |
| Geocoord | The latitude and longitude of a store |
| ID | A unique ID that is generated for each transaction |
| Latitude degree | Latitude of the store in decimal degrees |
| Longitude degree | Longitude of the store in decimal degrees |
| Market area name | A textual market area name that can include multiple stores |
| Market area number | A numerical market area descriptor |
| Merchant name | For gift cards usable at multiple locations, a name of the location where it is used |
| Merchant number | A unique identifying number associated with a particular merchant |
| Point of sale date | Date of a particular sale |
| Point of sale time | Time of a particular sale |
| Postal code | ZIP code (or similar) for the sale |
| Promo code | Used to indicate a particular type of card, such as graduation card |
| Promo description | Textual description of the promo code |
| Register ID | A unique identifier of a register at the store |
| Reverse date | A placeholder that is non-zero when a transaction is reversed |
| Reverse ID | A non-zero placeholder indicating if a transaction is reversed |
| Signed amount | Combines the sign and the amount into a single, floating-point number |
| State code | 2-letter state code corresponding with the store where the sale occurred |
| Store name | Textual description of the store where the sale occurred |
| Street address | Store street address where the sale occurred |
| Subdivision name | A name of a subdivision in which the sale occurred (i.e., "North Central Midwest") |
| Subdivision number | A number associated with the subdivision in which the sale occurred |
| Transaction code number | A transaction code that allows mapping to point of sale transaction internal to a data system |
| Term date | Date and time in the local timezone of the transacting store |
| Time zone code | The store's time zone (e.g., PST, CDT) |
| Transaction description | A textual description of the transaction code (e.g., BALANCE INQUIRY) |

| | |
|---|---|
| Transaction number | Used in conjunction with visit number and store number to uniquely identify a purchase in a brick-and-mortar store |
| Visit number | A unique identifier for a store on a given date, the visit number appears on a receipt along with other transaction data |

In addition to these transaction-specific pieces of information, aggregation fields can be added to the data in order to form the enriched data:

| | |
|---|---|
| Card age | The age of the card in decimal days |
| Dates seen | An array of dates and times at which the card was seen |
| Initial balance | Starting balance of the card |
| Total store count | An integer count of the stores the card has been seen at |
| Total transactions | A total number of transactions that the card has been used for |
| Last Seen | The last date and time the card was used or balance checked |
| Merchant name | Textual description of the activating merchant |
| Promo Description | Textual description of the card branding |
| Risk score | A metric indicating the card's risk score relative to typical card behavior |
| Spend max | Maximum positive spend (i.e., load or reload amount) |
| Spend Nonzero Minimum | The minimum amount of spending seen to date |
| Spend Stdev | Standard deviation of spending to date |
| Total Spend | Running total of transaction amounts |

The enriched data can be output to a CSV file or similar for ingestion into a NoSQL database such as Elasticsearch (a trademark of Elasticsearch BV) or similar. The fraud indicators are much more quickly searchable than the original, larger mainframe-formatted data file.

By enriching the data with the fields and aggregate fields as described above, and feeding a series of datapoints corresponding to misuse or non-misuse of gift cards through a machine learning program, indicators of gift card misuse can be detected which are then easily applied to future transactions, and which can be used to stop or prevent misuse from affecting gift card holders.

According to one embodiment, a method for rapid analysis of transactional data in a retail environment includes combining two datasets. The first set of data is from a source of real-time financial data, such as point-of-sale transaction data. The second set of data is a static financial data source, such as a database of past transactions.

Both sets of data can be translated into mainframe-formatted data for ingestion in a search database. The first set of data, including the real-time financial information, can be enriched by adding details from the second set of data to it, including fields such as the aggregated information or other indicators of gift card misuse, as described above. This enriched data, when added to the real-time data, can indicate anomalous transactions have occurred.

When a chargeback or other confirmation of gift card misuse occurs, that information can be used to update a machine learning algorithm and improve upon the misuse detection systems described herein. Those indicators can be routinely updated and output back into the search database, to better detect anomalous transactions in streaming data in the future.

In embodiments, anomalous transactions need not include just misuse or malfunction of a gift card. Other patterns that a store or a user wishes to track can also be identified using a similar model. The output, in embodiments, can be output to a cashier, or at a pharmacy counter, or can appear at a headquarters or other location offsite from the store, especially where patterns of anomalous usage occur that could prompt modifications to the gift card system to protect customers or other changes.

In embodiments, the real-time data that makes up the first data set described above could come from a multitude of sources. For many retailers, there are now both online and brick-and-mortar sources of sales, as alluded to in the fields shown above. Furthermore, a particular retailer may have multiple physical locations, or even multiple types of physical locations. Moreover, even within a store there may be multiple different sources of transactions, such as a pharmacy counter, an automotive center, a general cashier, an electronics desk, a clothing section, a grocery section, a customer service desk, etc. Each of these can provide a data stream, and combining the inputs from these data streams may be difficult using conventional techniques because of the amount of computer power that would be required to analyze each individual data point in isolation.

By identifying and summarizing the data from the child records into parent records (i.e., enriching the records and mapping fraud indicators onto them to form parent records) the search can be conducted much more quickly and easily, resulting in rapid and efficient detection of anomalous transactions.

Figure 3A:
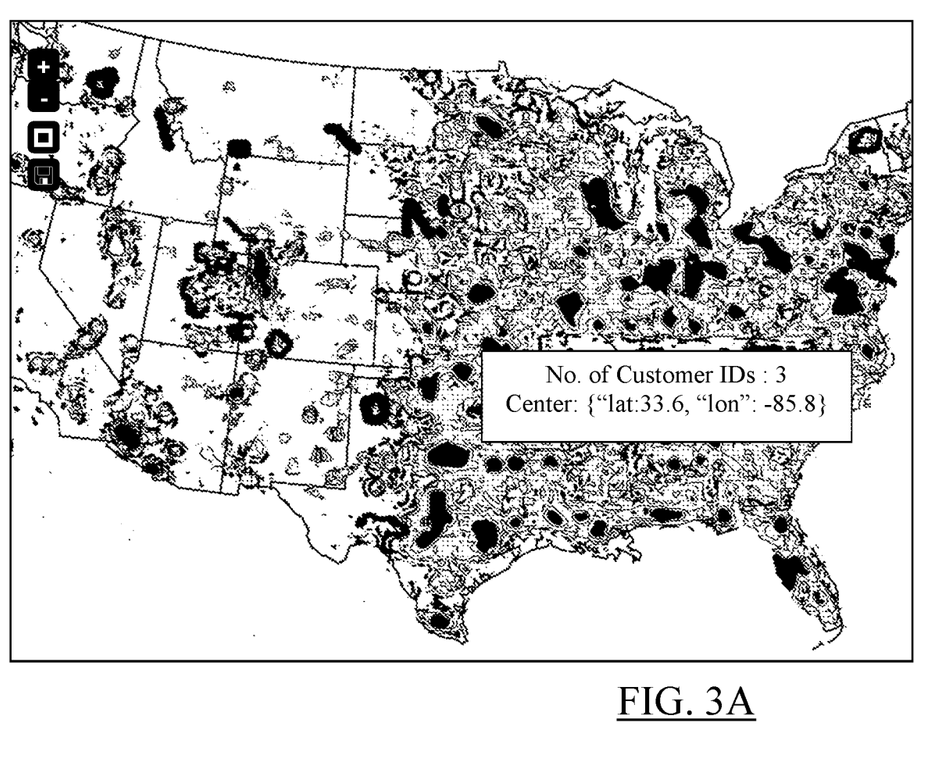
FIGS. 3A and 3B are output displays of analyzed transaction data according to an embodiment.

By using a unique key such as a card number, anomalous data can be tracked in new ways. For example, cards identified as related to anomalous or suspicious transactions can be mapped in a visual display as shown in FIG. 3A. As a user of a card associated with an anomalous transaction moves between stores, the heat map of FIG. 3A can be updated. In this way, if there are a large number of anomalous transactions in a specific region, store, or state, the systems and methods described herein can generate visualizations of such activity. These visualizations can be useful in rapidly diagnosing and remedying anomalies on a geographical scale.

Figure 3B:
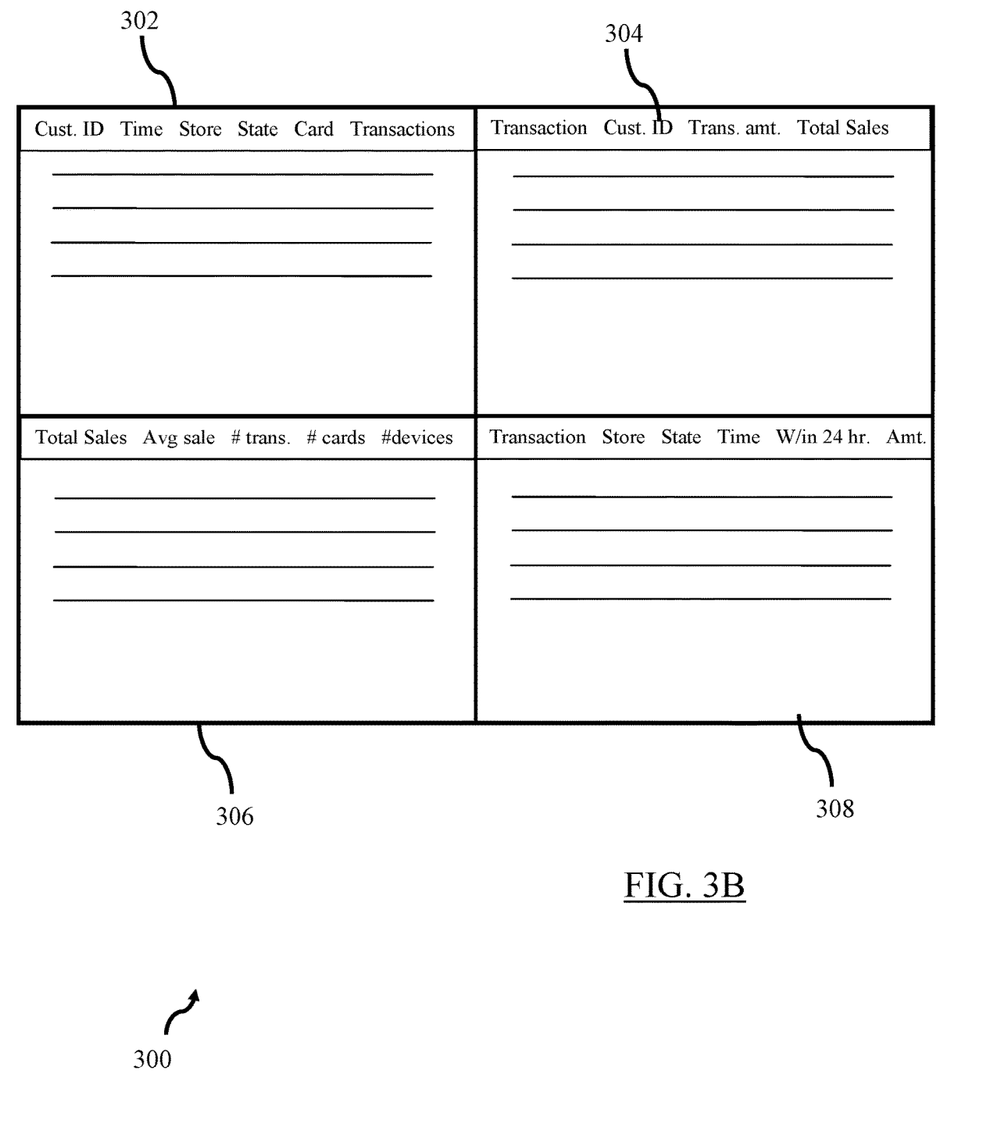

FIG. 3B is a table view depicting four sets of information in quadrants according to an embodiment of a display 300. In the upper-left quadrant 302, customer transactions are displayed sorted by transaction ID. These transactions can be flagged as having relatively higher or lower likelihood of being anomalous.

In the upper-right quadrant 304, flagged transactions from the upper-left quadrant 302 are displayed. For a large retail establishment, upper-left quadrant 302 can have thousands or even millions of transactions per day, while upper-right quadrant 304 can include only a small fraction of those transactions deemed unusual. Flagged transactions in upper-right quadrant 304 can be flagged in either of two ways.

First, transactions can be manually flagged. For example, a customer may notify a retailer that an unauthorized transaction was made on his or her credit card, debit card, or gift card. Based upon that information, the retailer can manually flag the transaction.

Second, similar transactions can be flagged automatically and in real-time by the system (e.g. system 100). The automatically identified information can be flagged based upon similarity to other, manually flagged information. Machine learning can be used to determine identifying characteristics of transactions that were manually flagged in order to recognize them as they appear in upper-left quadrant 302.

The machine learning system used to identify transactions in upper-left quadrant 302 and list them in upper-right quadrant 304 can be "taught" by creating mock anomalous transactions that have certain characteristics. For example, a mock transaction can be generated that shows a very high number of gift card balance checks, use in multiple locations within a short time frame, or a series of very small transactions. These mock transactions can be manually flagged and placed into upper-right quadrant 304 so that the system (e.g. system 100) will recognize similar transactions in future.

Lower-left quadrant 306 and lower-right quadrant 308 depict other ways of sorting transaction data by unique key. For example, in lower-left quadrant 306, data is sorted by customer account. In lower-right quadrant 308, data is sorted by transaction amount. Other sorting arrangements are possible that facilitate rapidly searching for and finding anomalous transactions so that enriched data and real-time transaction data can be monitored rapidly and automatically to detect anomalies.

Figure 4:
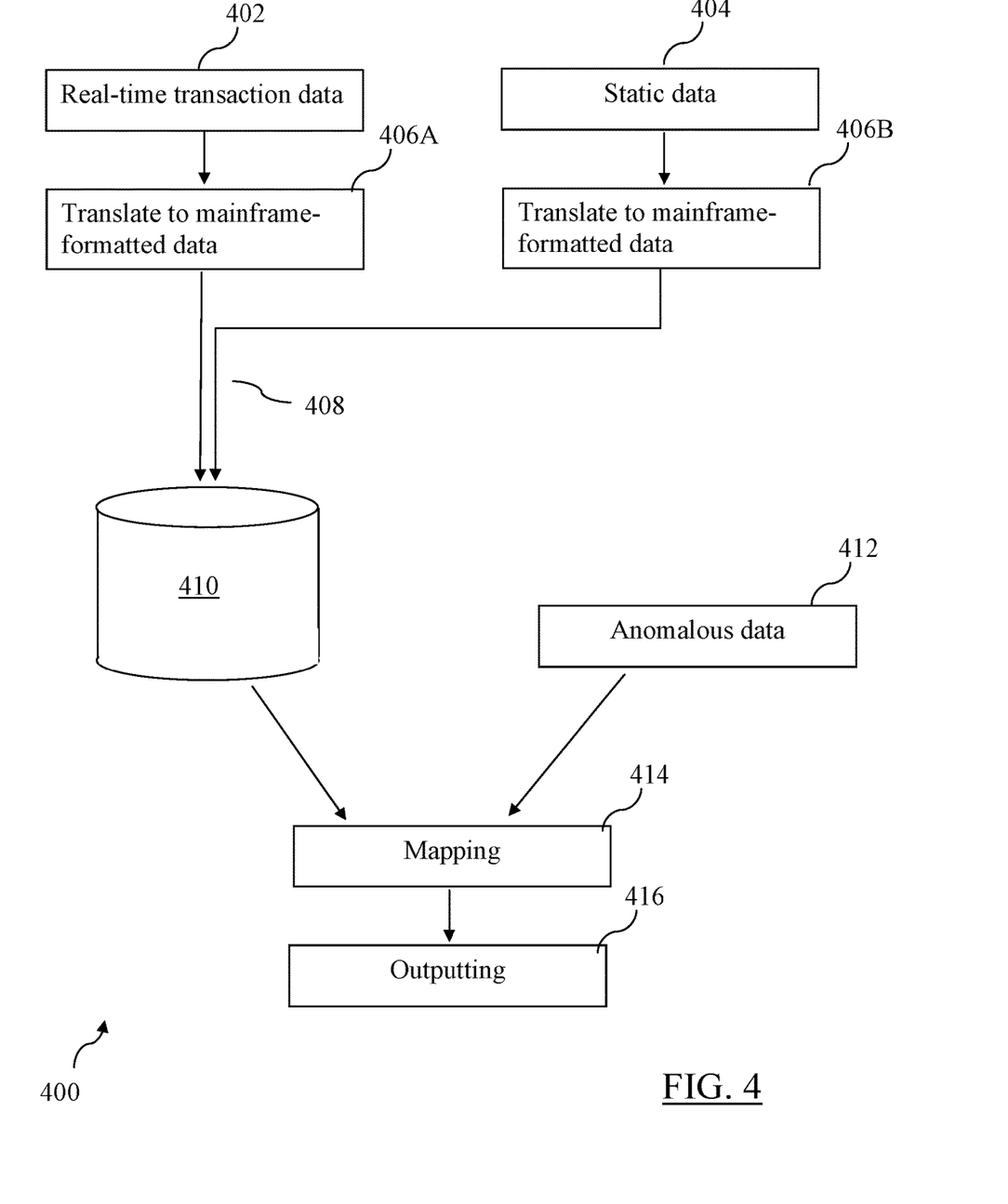
FIG. 4 is a flowchart of a method for detecting anomalous data according to an embodiment.

FIG. 4 is a flowchart depicting a method 400 of rapidly detecting anomalous transactions according to an embodiment.

According to method 400, real-time transactional data is gathered at 402. Real-time transactional data, as described above, includes a set of data elements that are associated with a specific transaction. Such data elements can include store location, credit card number or gift card number, transaction amount, user account ID or ISP address for online purchases, among others.

Likewise, static data is collected at module 404. Static data module 404 can be, for example, a database of information related to past purchases or other financial data. In embodiments, static data module 404 can be a database or other data storage device configured to store information about past purchases. In embodiments, static data module 404 is configured to store cumulative data, such as a location where a particular card is most often used, an average amount that a customer spends per transaction, a type of product purchased, or other information that is compiled from one or more past transactions in combination.

At 406A and 406B, the real-time and static data are translated to mainframe-formatted data, respectively. Translating the real-time and static data to mainframe-formatted data facilitates very rapid comparisons between the data. In alternative embodiments, other formatting could be used or filesystems could be implemented that are not run on a mainframe. In those embodiments, the real-time and static data can be formatted in a similar fashion for rapid comparison in some other type of computer system. After translation at 406A and 406B, each of the real-time and static data are formatted for ingestion into a search database.

At 408, at least some of the translated real-time data is enriched with corresponding translated static data. The mainframe-formatted real-time data can be compared to the mainframe-formatted static data by a key such as a customer ID, credit card number, or other identifying feature. The real-time data is then modified to include fields that can be indicative of anomalous transactions, such as an average transaction amount, a typical shopping location, or a frequency of balance checks of a card.

This enriched data from 408 is then stored in a search database 410. Search database 410 includes data that has been enriched but not yet analyzed for anomalous transactions.

Anomalous data 412 is compared to the enriched data in search database 410. Anomalous data 412 can be manually entered or alternatively can include rules based on machine learning, as described in more detail above with respect to FIGS. 3A and 3B. Anomalous data is compared to enriched data at mapping block 414, in which indicators of anomalous transactions are mapped onto the enriched data from search database 410.

At block 416, transaction data that has been flagged as anomalous at mapping block 414 is output. The output can be, for example, a geographic map output (as shown in FIG. 3A) or a table-style view (as shown in FIG. 3B), among others. In embodiments, outputting 416 can include listing a series of anomalous transactions for individual analysis. In other embodiments, outputting 416 can include a list of locations having the highest incidence of anomalous transactions. Other outputs can be generated based upon the filtering or sorting desired by the user among the mainframe-formatted data in search database 410.

The various embodiments depicted and described herein present numerous advantages over conventional techniques. While some analytic data could be derived by using SQL queries from a mainframe, the volume of gift card transactions could lead to extreme computation expense. For example, a "wall" time (i.e. the time as if measured on a wall clock and not time on the CPU's of the mainframe) of a SQL query from a transaction data store might be on the order of 30 seconds. Assuming that there are on the order of 1 million unique gift cards seen each day it would thus take about 8000 hours of wall time (30 seconds×1,000,000 unique gift cards) to do analysis of each card individually. With the data enriched and indexed in NoSQL data stores such as Elasticsearch each gift card can be queried in on the order of 1 second, or about 280 hour of wall time even when the data store is hosted on commodity Linux hardware that lacks the computational enhancements of a mainframe. This order of magnitude reduction in time to do full analysis illustrates the drastic reduction in compute cycles made possible by the present disclosure.

In one embodiment, the system 100 and/or its components or subsystems can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain, or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application-specific integrated circuit (ASIC) or field-10 programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The invention claimed is:

1. A method for rapid analysis of transactional data in a retail environment, the method comprising:
   accessing, with at least one processor, stored transaction data for a plurality of transactions;
   generating, with the at least one processor, a plurality of mock anomalous transactions having characteristics associated with anomalous transactions;
   automatically, with the at least one processor, flagging a first subset of the stored transaction data as having a high likelihood of being anomalous based on the characteristics associated with anomalous transactions, a second subset of the stored transaction data as having a low likelihood of being anomalous based on the characteristics associated with anomalous transactions, and the plurality of mock anomalous transactions as having a high likelihood of being anomalous based on the characteristics associated with anomalous transactions;
   training, with the at least one processor, a machine learning model to identify indicators of anomalous transactions based on the flagging;
   receiving, with the at least one processor, a first set of data from a source of real-time financial data;
   separating, with the at least one processor, the first set of data into a plurality of first entries and a plurality of child entries, each first entry having a first key field;
   linking, with the at least one processor, each of the first entries to at least one corresponding child entry;
   translating, with the at least one processor, the first set of data into mainframe-formatted data for ingestion in a non-relational search database;
   receiving, with the at least one processor, a second set of data from a source of static financial data, the second set of data including a plurality of second entries, each second entry having a second key field corresponding to the first key field;
   translating, with the at least one processor, the second set of data into mainframe-formatted data for ingestion in the non-relational search database;
   enriching, with the at least one processor, the first set of data by modifying a data structure of at least one first entry of the first set of data to include at least one second entry of the second set of data having a second key field value corresponding to the first key field value of the at least one first entry to form enriched data;
   determining, with the at least one processor, characteristics associated with the enriched data;
   mapping, with the at least one processor, using the non-relational database, the indicators of anomalous transactions onto the enriched data using the characteristics associated with anomalous transactions and the characteristics associated with the enriched data based on the machine learning model;

outputting, with the at least one processor, an indication of at least one anomalous transaction in the enriched data based on the mapping; and updating, with the at least one processor, the indicators of anomalous transactions of the machine learning model based on the mapping.

2. The method of claim 1, wherein receiving the first set of data from the source of real-time financial data comprises receiving real-time transaction data from a plurality of sources in the retail environment.

3. The method of claim 1, wherein receiving the first set of data from the source of real-time financial data comprises receiving real-time transaction data from an online store.

4. The method of claim 1, wherein mapping the indicators of anomalous transactions to the enriched data further comprises detecting misuse of a gift card to protect an owner of the gift card.

5. The method of claim 1, wherein a respective one of the characteristics associated with anomalous transactions includes a data field of gift card activity dates.

6. The method of claim 1, wherein a respective one of the characteristics associated with anomalous transactions includes a data field of a number of gift card account balance checks.

7. The method of claim 1, wherein a respective one of the characteristics associated with anomalous transactions includes a data field of at least one location of gift card use.

8. The method of claim 1, wherein a respective one of the characteristics associated with anomalous transactions includes a data field of a transaction amount.

9. The method of claim 1, wherein outputting the indication of at least one anomalous transaction in the enriched data comprises displaying a list of anomalous transactions.

10. The method of claim 1, wherein the stored transaction data and the plurality of mock anomalous transactions are stored in a first quadrant when unflagged and in a second quadrant when flagged.

11. A system for rapid analysis of transactional data, the system comprising:
   computing hardware of at least one processor and a memory operably coupled to the at least one processor; and
   instructions that, when executed on the computing hardware, cause the computing hardware to implement a plurality of modules including:
   a machine learning module configured to:
      access stored transaction data for a plurality of transactions,
      generate a plurality of mock anomalous transactions having characteristics associated with anomalous transactions,
      flag a first subset of the stored transaction data as having a high likelihood of being anomalous based on the characteristics associated with anomalous transactions, a second subset of the stored transaction data as having a low likelihood of being anomalous based on the characteristics associated with anomalous transactions, and the plurality of mock anomalous transactions as having a high likelihood of being anomalous based on the characteristics associated with anomalous transactions, and
      train a machine learning model to identify indicators of anomalous transactions based on the flagging;
   a source of real-time financial data;
   the plurality of modules further including a transaction processing module configured to separate a first set of data from the source of real-time financial data into a plurality of first entries and a plurality of child entries, each first entry having a first key field;
   a source of static financial data including a plurality of second entries, each second entry having a second key field corresponding to the first key field;
   the plurality of modules further including an ingestion module configured to translate the first set of data and the second set of data into mainframe-formatted data for ingestion in a non-relational search database;
   the plurality of modules further including an enrichment module configured to enrich the first set of data by modifying a data structure of at least one first entry of the first set of data to include at least one second entry of the second set of data having a second key field value corresponding to the first key field value of the at least one first entry to form enriched data;
   the plurality of modules further including a mapping module configured to determine characteristics associated with the enriched data and map, using the non-relational database, the indicators of anomalous transactions onto the enriched data using the characteristics associated with anomalous transactions and the characteristics of the enriched data based on the machine learning model; and
   a computer display configured to output an indication of at least one anomalous transaction in the enriched data based on the mapping module; and
   wherein the machine learning module is further configured to update the indicators of anomalous transactions of the machine learning model based on the mapping.

12. The system of claim 11, wherein the ingestion module configured to translate the first set of data from the source of real-time financial data into mainframe-formatted data for ingestion in the non-relational search database is the same as the ingestion module configured to translate the second set of data from the source of static financial data into mainframe-formatted data for ingestion in the non-relational search database.

13. The system of claim 11, wherein the first set of data comprises real-time transaction data in a retail environment.

14. The system of claim 11, wherein the first set of data comprises real-time transaction data at an online store.

15. The system of claim 11, wherein the mapping module is configured to detect misuse of a gift card to protect an owner of the gift card.

16. The system of claim 11, wherein a respective one of the characteristics associated with anomalous transactions includes a data field of gift card activity dates.

17. The system of claim 11, wherein a respective one of the characteristics associated with anomalous transactions includes a data field of a number of gift card account balance checks.

18. The system of claim 11, wherein a respective one of the characteristics associated with anomalous transactions includes a data field of at least one location of gift card use.

19. The system of claim 11, wherein a respective one of the characteristics associated with anomalous transactions includes a data field of a transaction amount.

20. The system of claim 11, wherein the machine learning module is further configured to store the transaction data and the plurality of mock anomalous transactions in a first quadrant when unflagged and in a second quadrant when flagged.

* * * * *